United States Patent
Fukuzawa et al.

(10) Patent No.: US 8,824,957 B2
(45) Date of Patent: Sep. 2, 2014

(54) WIRELESS COMMUNICATION SYSTEM, WIRELESS COMMUNICATION METHOD, WIRELESS COMMUNICATION TERMINAL DEVICE, RELAY DEVICE, AND RELAY SYSTEM

(75) Inventors: Shoji Fukuzawa, Osaka (JP); Yoshiyuki Tanaka, Osaka (JP)

(73) Assignee: Icom Incorporated (JP)

( * ) Notice: Subject to any disclaimer, the term of this patent is extended or adjusted under 35 U.S.C. 154(b) by 808 days.

(21) Appl. No.: 13/121,940

(22) PCT Filed: Oct. 28, 2009

(86) PCT No.: PCT/JP2009/068537
§ 371 (c)(1),
(2), (4) Date: Mar. 30, 2011

(87) PCT Pub. No.: WO2010/050533
PCT Pub. Date: May 6, 2010

(65) Prior Publication Data
US 2011/0189946 A1    Aug. 4, 2011

(30) Foreign Application Priority Data
Oct. 28, 2008 (JP) ................. 2008-277518

(51) Int. Cl.
| H04B 3/36 | (2006.01) |
| H04W 72/02 | (2009.01) |
| H04W 72/04 | (2009.01) |
| H04W 84/08 | (2009.01) |
| H04B 7/155 | (2006.01) |

(52) U.S. Cl.
CPC .......... *H04W 72/02* (2013.01); *H04W 72/042* (2013.01); *H04W 84/08* (2013.01); *H04B 7/15542* (2013.01)
USPC ............ 455/7; 455/11.1; 455/13.1; 455/13.2; 455/25

(58) Field of Classification Search
USPC ....................................... 455/7–25
See application file for complete search history.

(56) References Cited

U.S. PATENT DOCUMENTS

| 5,020,130 | A | 5/1991 | Grube et al. |
| 6,590,891 | B1 * | 7/2003 | Jacquet et al. ............. 370/350 |
| 2011/0306290 | A1 * | 12/2011 | Fukuzawa et al. ............ 455/7 |

FOREIGN PATENT DOCUMENTS

| CN | 101116363 | 1/2008 |
| EP | 0886451 A1 | 12/1998 |
| JP | 06-197074 | 7/1994 |

(Continued)

OTHER PUBLICATIONS

Notification of Reasons for Rejection issued Oct. 9, 2012 in Japanese Patent Application No. 2008-277518. (4 pages).
Chinese Office Action issued in corresponding Chinese Patent Application No. 200980141239.8 dated May 28, 2013.
Supplementary European search report dated Apr. 30, 2014 received in corresponding European Patent Application No. 09823643.3.

*Primary Examiner* — Fayyaz Alam
(74) *Attorney, Agent, or Firm* — Baker & McKenzie LLP (57) ABSTRACT

Wireless terminal devices (TA) to (TH) each detects whether channel information received from each of repeaters ($111_1$) to ($111_n$) indicates an occupied state or an idle state, and when detecting a channel in an idle state, writes identification information of that channel in a RAM (23). The wireless terminal devices (TA) to (TH) each selects a piece of identification information of a channel among plural pieces of identification information of a channel written in the RAM (23) to start making a call to a channel of the selected identification information.

14 Claims, 6 Drawing Sheets

(56) References Cited

FOREIGN PATENT DOCUMENTS

| JP | 1996-237722 | 9/1996 |
| JP | 1997-046755 | 2/1997 |
| JP | 10-117373 | 5/1998 |
| JP | 2000-138970 | 5/2000 |
| JP | 2001-237856 | 8/2001 |
| JP | 2006-093869 | 4/2006 |
| JP | 2006-109074 | 4/2006 |
| WO | WO2006/088082 | 8/2006 |
| WO | WO2007/142199 A1 | 12/2007 |

* cited by examiner

WIRELESS COMMUNICATION SYSTEM, WIRELESS COMMUNICATION METHOD, WIRELESS COMMUNICATION TERMINAL DEVICE, RELAY DEVICE, AND RELAY SYSTEM

RELATED APPLICATION

This application is based on Japanese Patent Application No. 2008-277518 filed on Oct. 28, 2008. The specification, claims, and drawings of this application are entirely incorporated herein by reference in this specification.

TECHNICAL FIELD

The present invention relates to a wireless communication system, a wireless communication method, a wireless communication terminal device, a relay device, and a relay system. More specifically, the present invention relates to a wireless communication system in which a wireless communication terminal device calls through an idle channel received from a relay device, a wireless communication method, the wireless communication terminal device, the relay device, and a relay system.

BACKGROUND ART

In recent days, communication traffic relayed by a relay device like a repeater increases with significant increase of the number of wireless terminal devices. Accordingly, there is proposed a distributed wireless communication system which allows a wireless terminal device to select at least one relay device among plural relay devices which are connected one another by a predetermined communication line when the wireless terminal device communicates with another wireless terminal device. In such wireless communication system, each wireless terminal device calls through a channel of a repeater to establish a communication path with a communication-counterparty wireless terminal device. The repeater notifies information indicating whether or not the current channel is busy or idle to wireless terminal devices in an area through a communication frame which is a unit of radio signal.

For example, according to patent literature 1, a communication frame includes a synchronization word, channel identification information, control information and random-access control information, and it is distinguished based on the channel identification information whether contents of the control information are a notification message which must be notified to a wireless terminal device or are an idle message which does not need to be notified thereto. The wireless terminal device which receives the channel identification information performs, when detecting that the control information is the idle message from the channel identification information, such intermittent reception as stopping receiving a frame while the control information is being as the idle message.

Because the idle message indicates the state in which a communication is not relayed between wireless terminal devices, i.e., the state of an idle channel, the wireless terminal device can detect whether or not a current channel is idle or busy.

Patent Literature 1: Unexamined Japanese Patent Application KOKAI Publication No. 2006-93869

DISCLOSURE OF INVENTION

Problem to be Solved by the Invention

Although a configuration such that a wireless terminal device detects an idle channel is employed based on the technology disclosed in patent literature 1, when plural wireless terminal devices each calls to that idle channel at the same time, a collision of the calls occurs, resulting in difficulty of establishment of a communication path. For example, in business wireless communication systems for a delivery company and for a taxi company, a wireless terminal device in each vehicle communicates with an administrative wireless terminal device via a repeater. In such systems, if a large number of wireless terminal devices each calls at the same time for notifying a departure at a specific time period, e.g., at 9 A.M., transmissions are concentrated in the same channel so that a probability that the collision of the calls occurs becomes high. Accordingly, the possibility of communication with the administrative wireless terminal device becomes high when a radio wave output by a wireless terminal device and received by the administrative wireless terminal device is intensive, but the possibility of communication with the administrative wireless terminal device becomes low when a radio wave output by a wireless terminal device and received by the administrative wireless terminal device is weak.

The present invention has been made in order to overcome the foregoing problem, and it is an object of the present invention to provide a wireless communication system, a wireless communication method, a wireless communication terminal device, a relay device, and a relay system which can avoid any occurrence of concentration of transmissions in the same channel and avoid a probability of occurrence of collision of calls from becoming high when plural wireless terminal devices wirelessly communicate with each other via the channel of the relay device.

Means for Solving the Problem

To achieve the foregoing object, a wireless communication system according to a first aspect of the present invention is a wireless communication system which comprises a relay system including a plurality of relay devices which are connected one another via a communication line and to which unique relaying channels are respectively allocated; and a plurality of wireless communication terminal devices which communicate with each other via the relay system, wherein each relay device transmits control information to the wireless communication terminal device which is registered in the own relay device, each wireless communication terminal device selects, based on the control information received from the relay device which registers the own wireless communication terminal device, a channel which is currently able to relay a communication among channels allocated to the respective relay devices to establish a communication between the wireless communication terminal devices, each relay device transmits a predetermined number of pieces of information on an idle channel selected in accordance with a predetermined rule among a plurality of pieces of information on an idle channel acquired via the communication line to the wireless communication terminal device which is registered in the own relay device, and each wireless communication terminal device starts establishing a communication between the wireless communication terminal devices on an idle channel selected in accordance with a predetermined rule based on the predetermined number of pieces of information on an idle channel received and acquired from the relay device which registers the own wireless communication terminal device.

Each relay device may select the predetermined number of pieces of information on an idle channel in an ascending order of number from a channel number of the own relay device or in a descending order of number from the channel number of the own relay device among the plurality of pieces of information on an idle channel acquired via the communication line, and may transmit the selected pieces of information on an idle channel to the wireless communication terminal device which is registered in the own relay device.

Each wireless communication terminal device may start establishing a communication between the wireless communication terminal devices on an idle channel selected at random based on the acquired predetermined number of pieces of information on an idle channel.

Each wireless communication terminal device may start establishing a communication between the wireless communication terminal devices on an idle channel selected in accordance with a different rule according to the relay device which registers the own wireless communication terminal device based on the acquired predetermined number of pieces of information on an idle channel.

To achieve the foregoing object, a wireless communication method according to a second aspect of the present invention allows a plurality of wireless communication terminal devices to communicate with each other via a relay system including a plurality of relay devices which are connected one another via a communication line and to which unique relaying channels are respectively allocated, wherein each relay device transmits control information to the wireless communication terminal device which is registered in the own relay device, and each wireless communication terminal device selects, based on the control information received from the relay device which registers the own wireless communication terminal device, a channel which is currently able to relay a communication among channels allocated to the respective relay devices to establish a communication between the wireless communication terminal devices, each relay device transmits a predetermined number of pieces of information on an idle channel selected in accordance with a predetermined rule among a plurality of pieces of information on an idle channel acquired via the communication line to the wireless communication terminal device which is registered in the own relay device, and each wireless communication terminal device starts establishing a communication between the wireless communication terminal devices on an idle channel selected in accordance with a predetermined rule based on the predetermined number of pieces of information on an idle channel received and acquired from the relay device which registers the own wireless communication terminal device.

To achieve the foregoing object, a wireless communication terminal device according to a third aspect of the present invention is in a wireless communication system which comprises a relay system including a plurality of relay devices which are connected one another via a communication line and to which unique relaying channels are respectively allocated, and a plurality of wireless communication terminal devices which communicate with each other via the relay system, wherein each relay device transmits control information to the wireless communication terminal device which is registered in the own relay device, each wireless communication terminal device selects, based on the control information received from the relay device which registers the own wireless communication terminal device, a channel which is currently able to relay a communication among channels allocated to the respective relaying devices to establish a communication between the wireless communication terminal devices, wherein the wireless communication terminal device receives a predetermined number of pieces of information on an idle channel selected in accordance with a predetermined rule based on a plurality of pieces of information on an idle channel acquired via the communication line by the relay device which registers the own wireless communication terminal device, and starts establishing a communication between the wireless communication terminal devices on an idle channel selected in accordance with a predetermined rule based on the predetermined number of pieces of information on an idle channel.

The wireless communication terminal device may start establishing a communication between the wireless communication terminal devices on an idle channel selected at random based on the acquired predetermined number of pieces of information on an idle channel.

The wireless communication terminal device may start establishing a communication between the wireless communication terminal devices on an idle channel selected in accordance with a different rule according to the relay device which registers the own wireless communication terminal device based on the acquired predetermined number of pieces of information on an idle channel.

To achieve the foregoing object, a relay device according to a fourth aspect of the present invention is in a wireless communication system which comprises a relay system including a plurality of relay devices which are connected one another via a communication line and to which unique relaying channels are respectively allocated, and a plurality of wireless communication terminal devices which communicate with each other via the relay system, each relay device transmits control information to the wireless communication terminal device which is registered in the own relay device, and each wireless communication terminal device selects, based on the control information received from the relay device which registers the own wireless communication terminal device, a channel which is currently able to relay a communication among channels allocated to the respective relay devices to establish a communication between the wireless communication terminal devices, wherein the relay device transmits a predetermined number of pieces of information on an idle channel selected in accordance with a predetermined rule among a plurality of pieces of information on an idle channel acquired via the communication line to the wireless communication terminal device which is registered in the own relay device.

The relay device may select the predetermined number of pieces of information on an idle channel in an ascending order of number from a channel number of the own relay device or in a descending order of number from the channel number of the own relay device among the plurality of pieces of information on an idle channel acquired via the communication line and which may transmit the selected pieces of information on an idle channel to the wireless communication terminal device which is registered in the own relay device.

To achieve the foregoing object, a relay system according to a fifth aspect of the present invention is a relay system which comprises a plurality of relay devices which are connected one another via a communication line and to which unique relaying channels are respectively allocated, each relay device transmits control information to a wireless communication terminal device which is registered in the own relay device, and each wireless communication terminal device selects, based on the control information received from the relay device which registers the own wireless communication terminal device, a channel which is currently able to relay a communication among channels allocated to the respective relay devices to establish a communication between the wireless communication terminal devices, wherein each relay device transmits a predetermined number of pieces of information on an idle channel selected in accordance with a predetermined rule among a plurality of pieces of information on an idle channel acquired via the communication line to the wireless communication terminal device which is registered in the own relay device, and each wireless communication terminal device starts establishing a communication between the wireless communication terminal devices on an idle channel selected in accordance with a predetermined rule based on the predetermined number of pieces of information on an idle channel received and acquired from the relay device which registers the own wireless communication terminal device.

Each relay device may select the predetermined number of pieces of information on an idle channel in an ascending order of number from a channel number of the own relay device or in a descending order of number from the channel number of the own relay device among the plurality of pieces of information on an idle channel acquired via the communication line, and may transmit the selected pieces of information on an idle channel to the wireless communication terminal device which is registered in the own relay device.

Each wireless communication terminal device may start establishing a communication between the wireless communication terminal devices on an idle channel selected at random based on the acquired predetermined number of pieces of information on an idle channel.

Each wireless communication terminal device may start establishing a communication between the wireless communication terminal devices on an idle channel selected in accordance with a different rule according to the relay device which registers the own wireless communication terminal device based on the acquired predetermined number of pieces of information on an idle channel.

Effect of the Invention

According to the present invention, it is possible to avoid any occurrence of concentration of transmissions on the same channel and avoid a probability of occurrence of collision of calls from becoming high when plural wireless terminal devices wirelessly communicate with each other via the channel of a relay device. As a result, in a wireless communication system with the limited number of channels, idle channels are used efficiently, thereby suppressing any congestion of communication beforehand.

BEST MODE FOR CARRYING OUT THE INVENTION

An explanation will be given of an embodiment of a wireless communication system according to the present invention with reference to the accompanying drawings.

Figure 1:
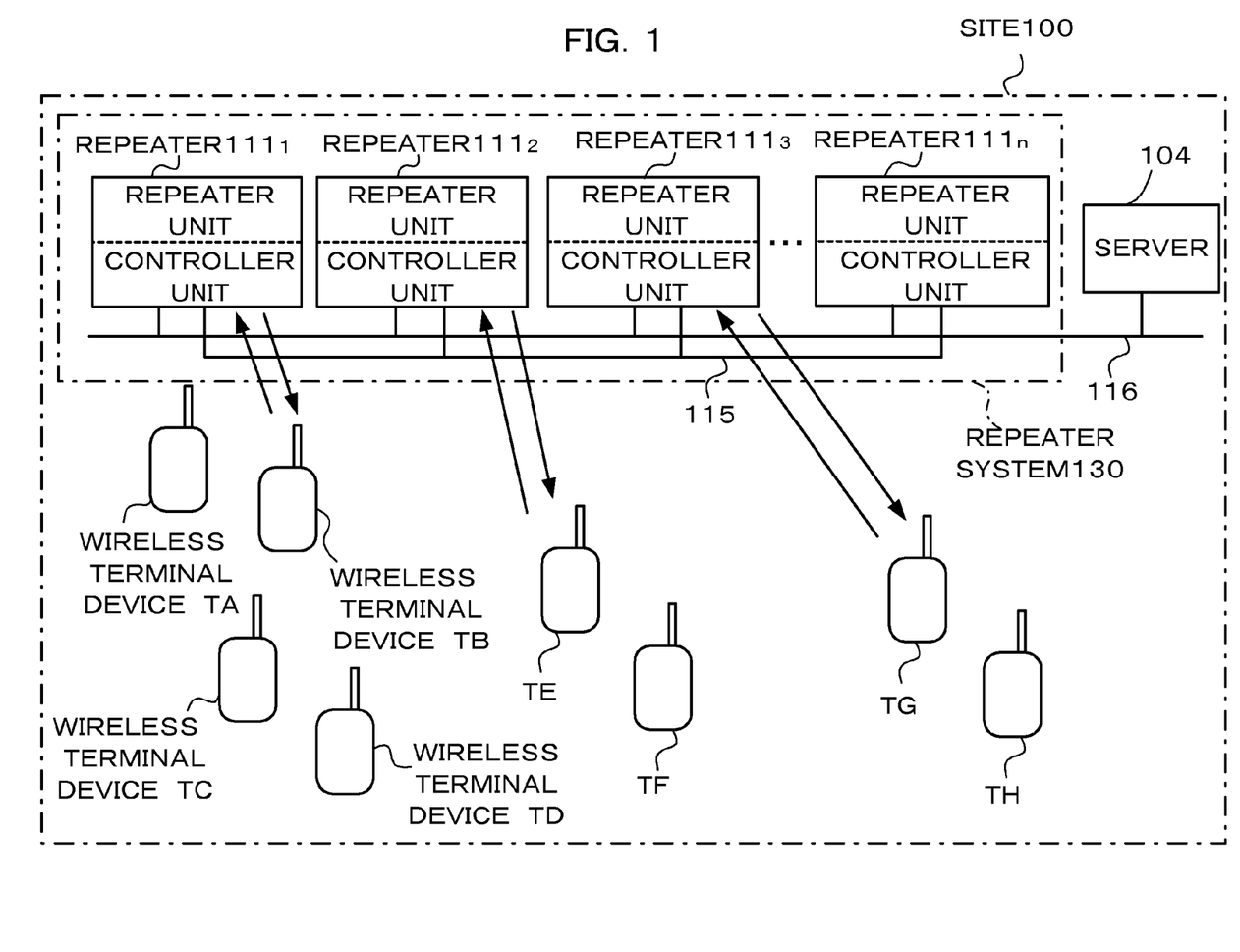
FIG. 1 is a diagram showing a configuration of a wireless communication system to which a wireless terminal device according to an embodiment of the present invention is applied.

As shown in FIG. 1, a site 100 of the wireless communication system according to the present embodiment includes plural (e.g., thirty units at maximum) repeaters $111_1$ to $111_n$ connected one another via a communication line 115. Unique relaying channels are respectively allocated to the plural repeaters $111_1$ to $111_n$, and those repeaters bear a relaying process in the same communication area. The plural repeaters $111_1$ to $111_n$ connected one another via the communication line 115 configure a repeater system (a relay system) 130. That is, the repeater system 130 configures a communication area with n number of channels (where n is the number of repeaters). Moreover, the repeater system 130 including the plural repeaters $111_1$ to $111_n$ is connected to a server 104 via a communication line 116 like an IP connection line. In general, the communication line 115 is called a "system bus", so that the communication line 115 is referred to as the system bus in the following explanation.

The server 104 can perform various settings of the plural repeaters $111_1$ to $111_n$ through a remote operation. The repeaters $111_1$ to $111_n$ each includes a repeater unit and a controller unit. Moreover, information on the respective repeaters $111_1$ to $111_n$ (e.g., whether or not such repeaters are relaying a communication) is exchanged and shared via the system bus 115. At which time slot data is to be transmitted is set for each of the repeaters $111_1$ to $111_n$ beforehand. Accordingly, the repeaters $111_1$ to $111_n$ each transmits data at a time slot set beforehand.

One repeater among the plural repeaters $111_1$ to $111_n$ is set as a "master repeater". An explanation will now be given of a case in which the repeater $111_1$ is the master repeater among the repeaters $111_1$ to $111_n$. The master repeater transmits a synchronization signal to the system bus 115 for establishing a synchronization with the repeaters $111_1$ to $111_n$ including the master repeater itself.

Wireless terminal devices TA to TH each registers any one repeater among the repeaters $111_1$ to $111_n$ as a home repeater. The wireless terminal devices TA to TH each receives a downlink signal of the home repeater in a standby mode. The wireless terminal devices TA to TH each acquires idle-channel information inserted in the downlink signal of the home repeater, and shifts a channel frequency to the channel frequency of that idle channel to communicate with the other wireless terminal devices TA to TH. After the communication ends, the wireless terminal device returns the channel frequency to the channel frequency of the home repeater and returns to the standby mode. In FIG. 1, the wireless terminal devices TA to TD register the repeater $111_1$ as a home repeater, the wireless terminal devices TE and TF register the repeater $111_2$ as a home repeater, and the wireless terminal devices TG and TH register the repeater $111_3$ as a home repeater.

The wireless communication system in FIG. 1 is a distributed trunking system in which the wireless terminal devices TA to TH share the plural repeaters $111_1$ to $111_n$ and select at least one repeater as needed for relaying among those repeaters. The distributed trunking system has no dedicated control channel, and all channels serve not only as control channels, but also as communication channels. For example, it is presumed that the wireless terminal device TA communicates with the other wireless terminal devices TB to TD which are registered in the same home repeater. In this case, the wireless terminal device TA acquires channel information which is included in a downlink signal from the repeater $111_1$ that is the home repeater of the wireless terminal device and which indicates channels enabling a communication, determines the channels enabling a communication based on the acquired channel information, selects one of the determined channels enabling a communication (e.g., the channel of the repeater $111_3$), and shifts the channel frequency to that of the selected channel.

Moreover, the wireless terminal device TA transmits a call request signal to that channel (the repeater $111_3$), receives a response to the effect that a communication is permitted from the repeater $111_3$ providing that channel, and establishes a link. Each of the wireless terminal devices TB to TD that are communication counterparties receives a control signal which is transmitted from the home repeater $111_1$ and which instructs shifting to a communication channel (the channel of the repeater $111_3$) where the wireless terminal device TA has established the link, and shifts channel frequencies to a channel frequency for the instructed channel to communicate with the wireless terminal device TA. That is, the repeater $111_1$ operates as a control channel for the wireless terminal devices TA to TD which register the repeater as the home repeater, and operates as a communication channel for the other wireless terminal devices TE to TH. Examples of a communication among the wireless terminal devices TA to TD are a group communication across the whole wireless terminal devices TA to TD, and with the unit of such group being further divided, a group communication in a small group defined by, for example, the wireless terminal devices TA and TB, or an individual calling (referred to as an "Individual Call") with a wireless terminal device being targeted.

Figure 2:
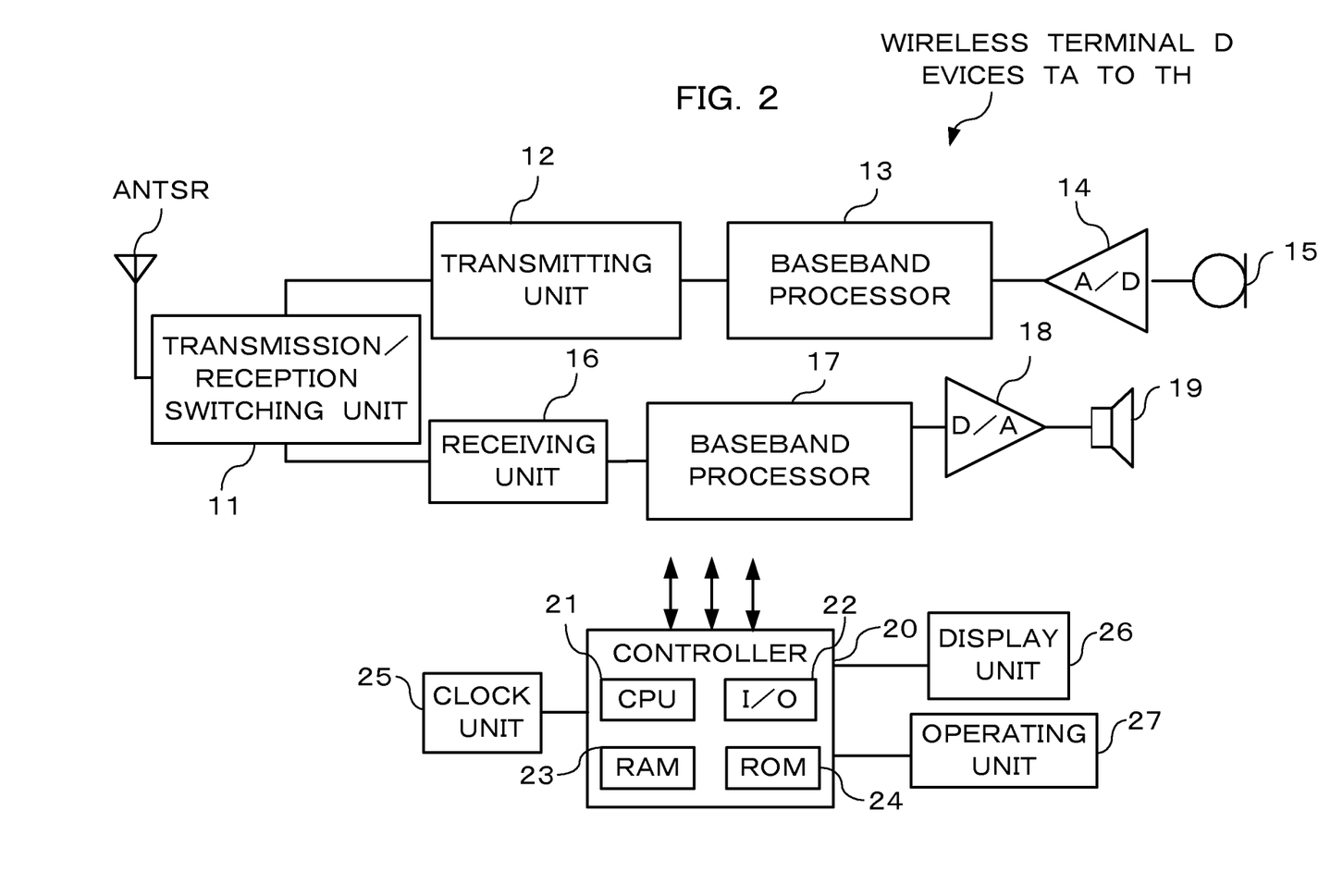
FIG. 2 is a block diagram showing a configuration of the wireless terminal device in FIG. 1.
Figure 3:
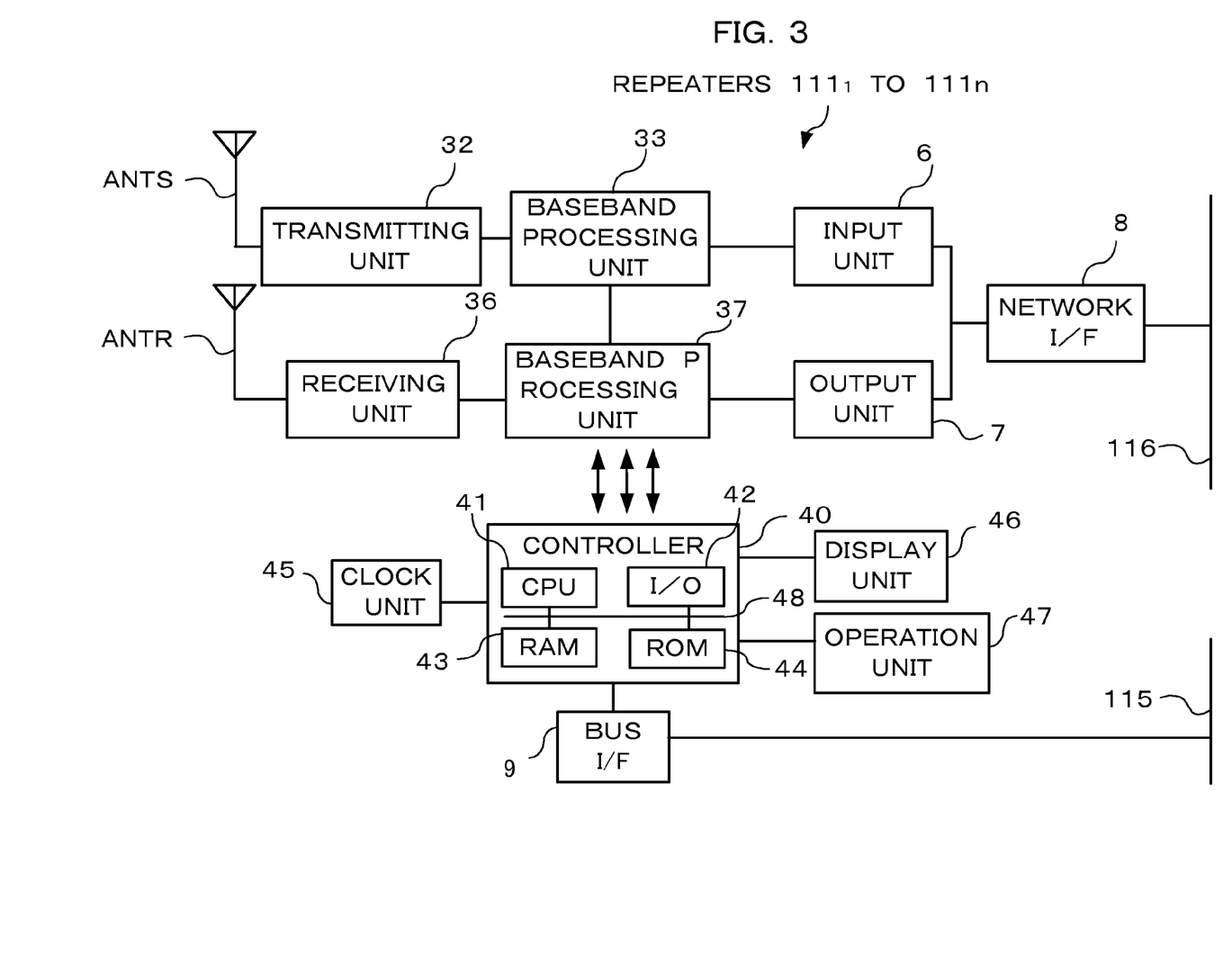
FIG. 3 is a block diagram showing a configuration of a repeater in FIG. 1.
Figure 4:
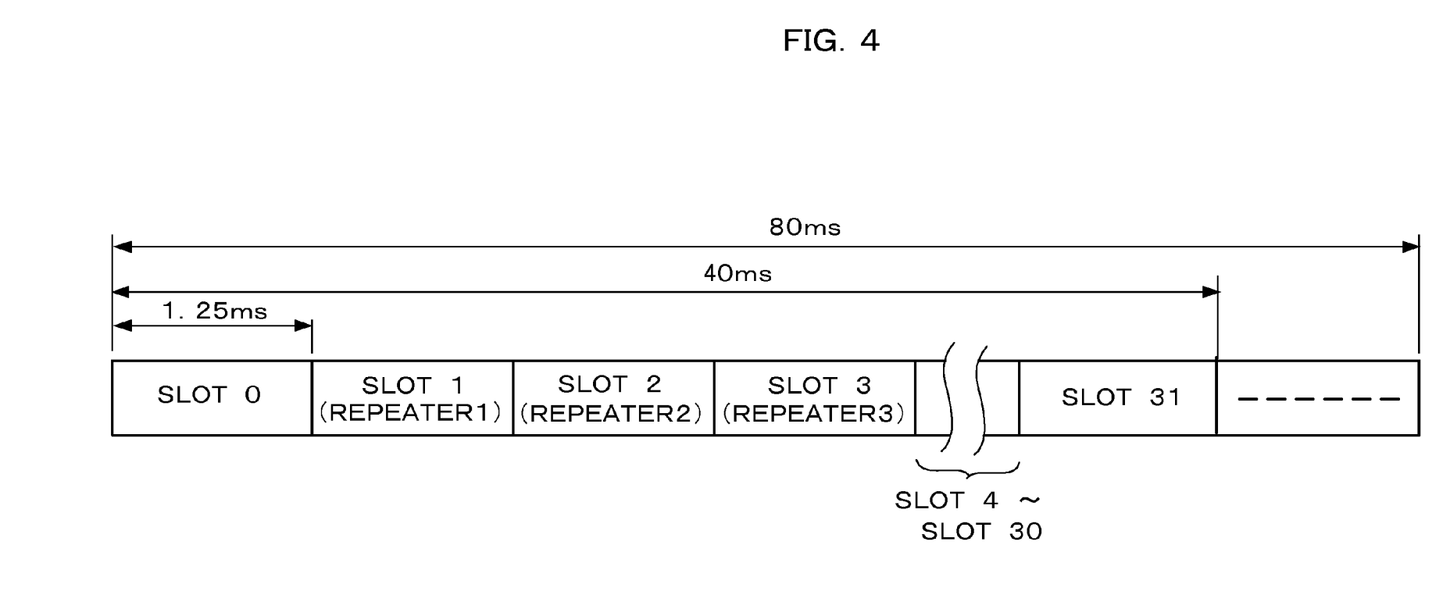
FIG. 4 is a diagram showing a synchronization signal transmitted to a system bus from a master repeater both in FIG. 1 and a time slot which follows the synchronization signal and which is allocated to each repeater.

Next, with respect to the wireless terminal devices TA to TH and the repeaters $111_1$ to $111_n$, an explanation will be given of a configuration and a function. FIG. 2 is a block diagram showing a configuration of each of the wireless terminal devices TA to TH in FIG. 1. FIG. 3 is a block diagram showing a configuration of each of the repeaters $111_1$ to $111_n$ in FIG. 1. FIG. 4 is a diagram showing a synchronization signal transmitted to the system bus 115 from the master repeater $111_1$, and a time slot which follows the synchronization signal and which is allocated to each repeater. FIGS. 5A and 5B are diagrams each showing a format of a communication frame exchanged between the repeater and the wireless terminal device. The communication frame includes a header part and a data part. Contents of the header part and those of the data part will be discussed later in detail.

As shown in FIG. 2, as blocks for a signaling system, the wireless terminal devices TA to TH each includes an antenna ANTSR, a transmission/reception switching unit 11, a transmitting unit 12, a baseband processor 13, an A/D converter 14, a microphone 15, a receiving unit 16, a baseband processor 17, a D/A converter 18, and a speaker 19. Moreover, as blocks for a control system, the wireless terminal devices TA to TH each includes a controller 20, a clock unit 25, a display unit 26, and an operating unit 27. Furthermore, the controller 20 has a CPU (central processing unit) 21, an I/O (input/output unit) 22, a RAM (random access memory) 23, a ROM (read-only memory) 24, and an internal bus 28 which connects those together.

The blocks for the signaling system of each of the wireless terminal devices TA to TH are controlled by the CPU 21. The CPU 21 runs a control program stored in the ROM 24 to control the whole wireless terminal device, processes commands and data both input from the operating unit 27 via the I/O 22 and data acquired from the baseband processor 17, and temporarily stores such data in the RAM 23. Moreover, the CPU 21 displays commands and data both stored as needed on the display unit 26 comprising an LCD (Liquid Crystal Display) or the like. Furthermore, the CPU 21 displays a current time acquired from the clock unit 25 on the display unit 26. Note that the controller 20 may employ a structure such that a rewritable nonvolatile memory card like a flash memory which records identification information unique to the wireless terminal device is detachably attached.

Next, with respect to the blocks for the signaling system, the transmission/reception switching unit 11 has an input end connected to the antenna ANTSR, and has an output end alternatively connected to the transmitting unit 12 or to the receiving unit 16 under the control of the CPU 21. When no transmission operation is made through the operating unit 27, the terminal device is in a receiving (standby) mode, and the output end of the transmission/reception switching unit 11 is connected to the receiving unit 16. Conversely, when a transmission operation is made through the operating unit 27, the wireless terminal device becomes a transmitting mode, and the output end of the transmission/reception switching unit 11 is connected to the transmitting unit 12.

When each of the wireless terminal devices TA to TH is in the transmitting mode, the microphone 15 outputs an analog voice signal in accordance with an voice input given by a user to the A/D converter 14.

The A/D converter 14 converts the analog voice signal from the microphone 15 into a digital voice signal and outputs it to the baseband processor 13.

The baseband processor 13 generates a communication frame (a baseband signal) in a predetermined format based on the digital voice signal from the A/D converter 14, or based on data stored in the RAM 23 of the controller 20, and outputs the generated communication frame to the transmitting unit 12.

The transmitting unit 12 modulates a carrier wave using the communication frame from the baseband processor 13, and transmits the modulated wave to a repeater currently performing a relaying operation via the transmission/reception switching unit 11 and the antenna ANTSR. GMSK (Gaussian filtered Minimum Shift Keying), PSK (Phase Shift Keying), QAM (Quadrature Amplitude Modulation), FSK (Frequency Shift Keying), etc., is applied to the modulation scheme of the transmitting unit 12.

When each of the wireless terminal devices TA to TH is in the receiving mode, the transmission/reception switching unit 11 connects the antenna ANTSR and the receiving unit 16 together. The receiving unit 16 receives wireless signals from respective repeaters $111_1$ to $111_n$ via the antenna ANTSR. The receiving unit 16 amplifies the received signal, performs a signal process like a demodulation process on the received signal, and outputs the processed signal to the baseband processor 17.

The baseband processor 17 extracts a communication frame from the demodulated signal output by the receiving unit 16. Moreover, the baseband processor 17 outputs information on a header part H of the extracted communication frame to the CPU 21. The CPU 21 analyzes the information on the header part H, and when the transmission destination of the received signal is a own station, output data of a voice signal included in a data part D to the D/A converter 18, temporarily stores data other than the audio signal included in the data part D in the RAM 23, and displays such data as needed on the display unit 26. The D/A converter 18 converts the voice signal from the baseband processor 17 from the digital voice signal into an analog voice signal, and causes the speaker 19 to generate sounds corresponding to such audio signal.

As shown in FIG. 3, as blocks for a signaling system, the repeaters $111_1$ to $111_n$ each includes an antenna ANTS for transmission only, a transmitting unit 32, a baseband processor 33, an antenna ANTR for reception only, a receiving unit 36, a baseband processor 37, an input unit 6, an output unit 7, and a network I/F (interface) 8. Moreover, as blocks for a control system, each repeater includes a controller 40, a clock unit 45, a display unit 46, and an operating unit 47. Furthermore, the controller 40 has a CPU (central processing unit) 41, an I/O (input/output unit) 42, a RAM (random access memory) 43, a ROM (read-only memory) 44, and an internal bus 48 which connects those together. Moreover, the repeaters $111_1$ to $111_n$ each includes a bus I/F (interface) 9 for transmitting information on a own repeater to the system bus 115 to be discussed later and for acquiring information from another repeater.

As the repeaters $111_1$ to $111_n$ (e.g., the repeater $111_n$) each performs signal processes, such as an amplification process and a waveform process, on a wireless signal received from a departure wireless terminal device (e.g., the wireless terminal device TA) and transmits such processed wireless signal to a destination wireless terminal device (e.g., the wireless terminal device TB), each of those repeaters basically has the same configuration as that of each of the wireless terminal devices TA to TH shown in FIG. 2. Consequently, with respect to structural elements which are basically same as those of the wireless terminal devices TA to TH shown in FIG. 2, the duplicated explanation thereof will be omitted.

When the wireless terminal devices TA to TH communicate with each other via the repeaters $111_1$ to $111_n$, an uplink from the wireless terminal device to the repeater and a downlink from the repeater to the wireless terminal device are communicated at substantially same time by changing respective frequencies or respective time slots. Consequently, the repeaters $111_1$ to $111_n$ each includes the antenna ANTS for transmission only and the antenna ANTR for reception only. Moreover, as shown in FIG. 1, the plural repeaters $111_1$ to $111_n$ are connected one another via the system bus 115, and are connected to the server 104 via the communication line 116 like the IP connection line.

Under the control of the CPU 41, the input unit 6 inputs data or the like transmitted from the server 104 via the network I/F 8, and supplies such data to the baseband processor 33. Moreover, under the control of the CPU 41, the output unit 7 outputs data or the like supplied from the baseband processor 37 to the server 104 via the network I/F 8.

Furthermore, when a multisite network is built in which a repeater communicates with another repeater in another site configuring a different communication area, the input unit 6 and the output unit 7 exchange a communication frame with another repeater in another site via the network I/F 8. The bus I/F 9 intermediates acquisition of a synchronization signal transmitted to the system bus 115 by a master repeater and of repeater information transmitted to the system bus 115 by repeaters other than a own repeater under the control of the CPU 41, and transmission of information on the own repeater to the system bus 115 under the control of the CPU 41.

Next, an explanation will be given of a wireless communication method of the wireless terminal system according to the embodiment with reference to FIG. 4 to FIG. 6.

A synchronization signal in FIG. 4 has a period of 80 ms, and the first half of 40 ms includes thirty-two slots from a slot 0 to a slot 31. Consequently, each slot has a time length of 1.25 ms. The first slot 0 is a synchronization signal, and transmitted by a specific repeater, i.e., the master repeater $111_1$ in accordance with a set algorithm, and the other repeaters $111_2$ to $111_n$ serve as slave repeaters and acquire that synchronization signal. The repeaters $111_1$ to $111_n$, i.e., the repeater system 130 operates in synchronization with the synchronization signal. Any one of the slots from the slot 1 to the slot 31 other than the slot 0 for synchronization is allocated to each of the repeaters $111_1$ to $111_n$. The repeaters $111_1$ to $111_n$ each writes information on each shared repeater in a slot allocated to a own repeater. The repeater $111_1$ which is the master repeater transmits the synchronization signal in the slot 0, and writes information on the repeater $111_1$ (e.g., information indicating whether the repeater $111_1$ is idle or busy a communication) in a slot allocated to the repeater $111_1$ among the slots from the slot 1 to the slot 31. Note that the last slot 31 is used for connecting external devices for future extensions.

FIG. 5A shows an illustrative format of a communication frame when a link with a communication channel is established, and FIG. 5B shows an illustrative format of a communication frame at the time of voice and data communication. In FIGS. 5A and 5B, the format of each communication frame has a configuration of 80 ms and 384 bits. Moreover, a preamble (P) equal to or larger than 24 bits is affixed to the header of the frame at the time of an initial transmission only. FSW is a frame synchronization word, LICH is a link information channel, SCCH is a signaling information channel for trunking control, and G is a guard time.

Figure 5:
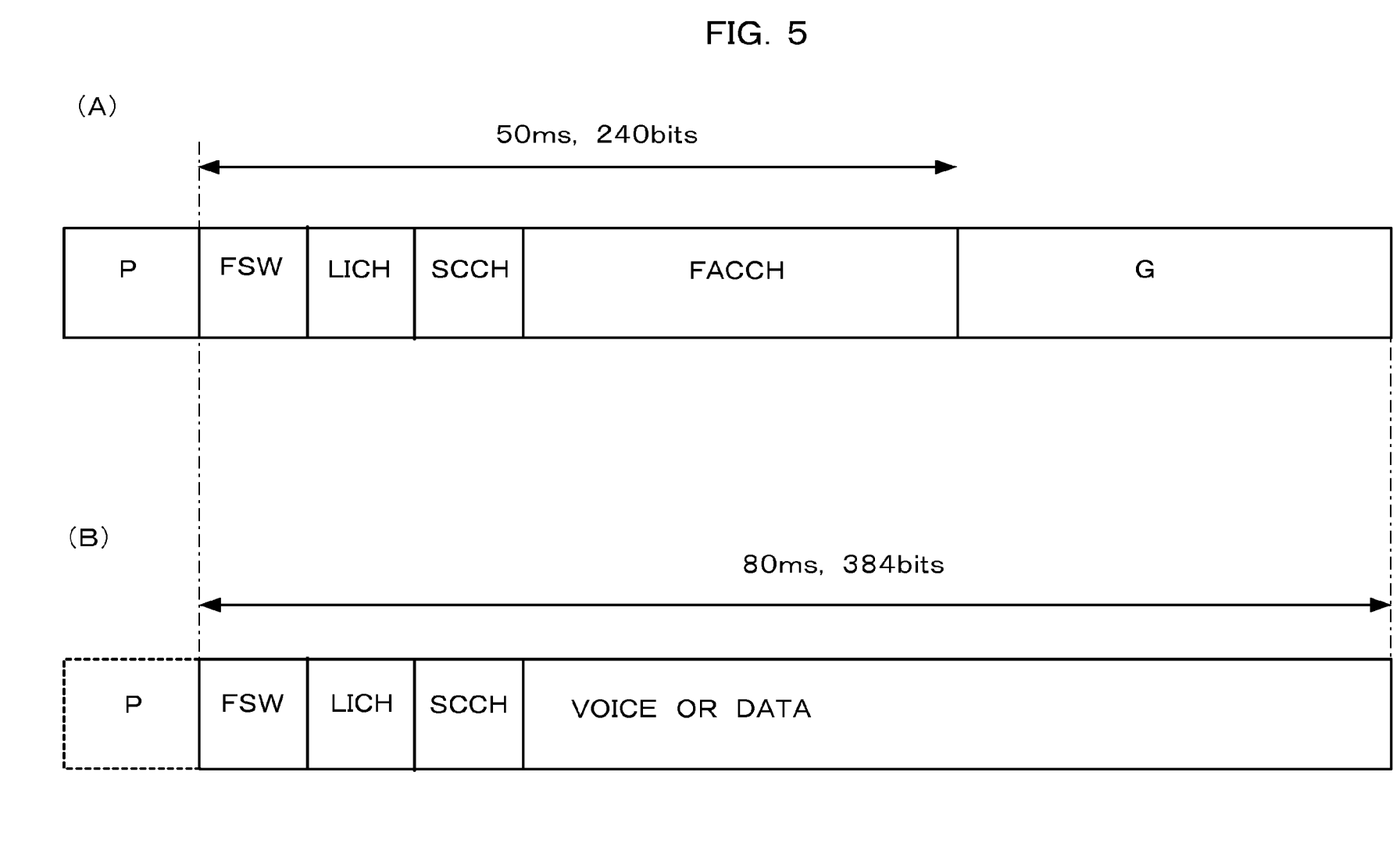
FIG. 5 is a diagram showing a format of a communication frame exchanged between the repeater and the wireless terminal device both in FIG. 1.
Figure 6:
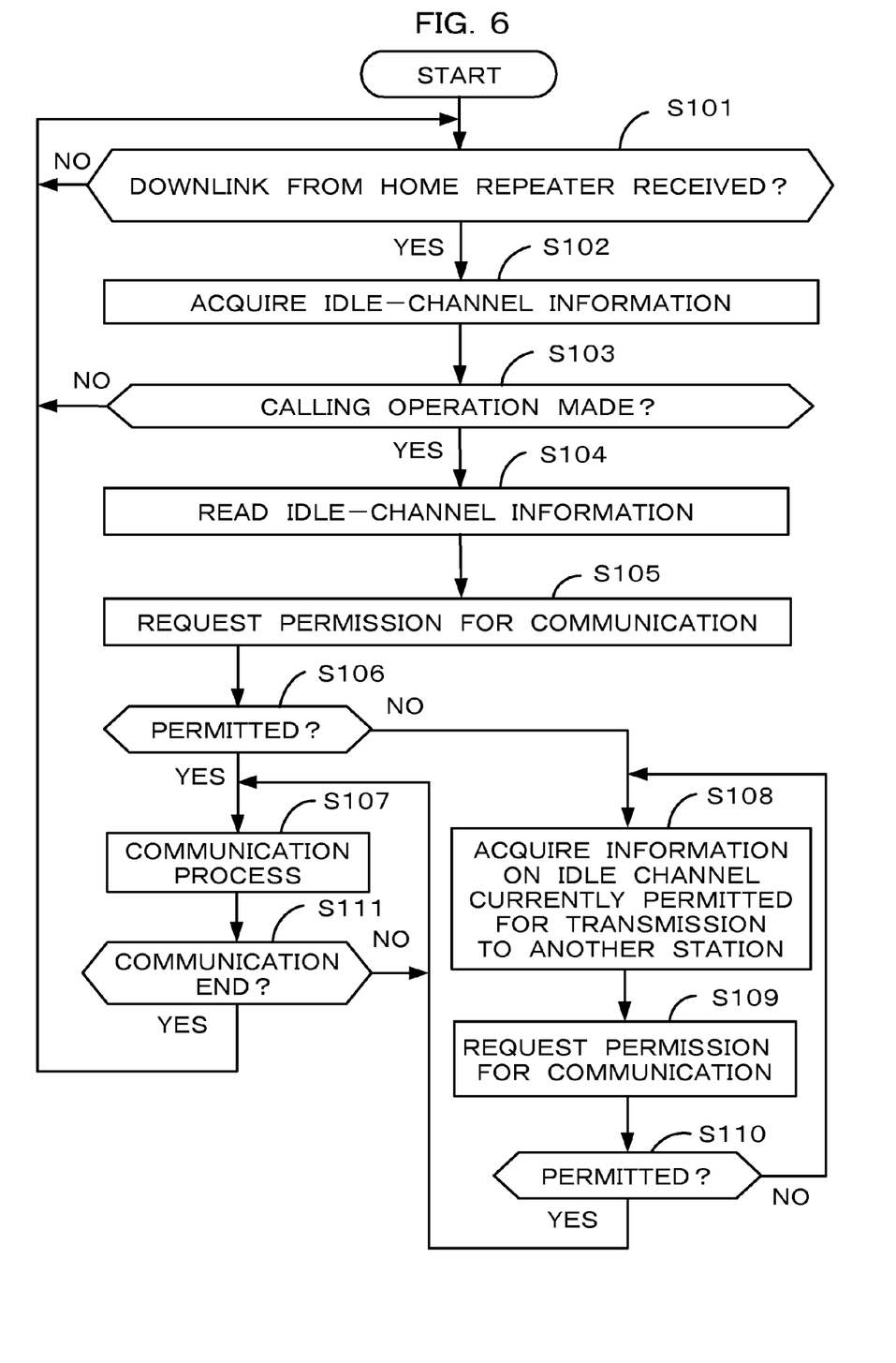
FIG. 6 is a flowchart showing an operation of a CPU of the wireless terminal device in FIG. 2.

FIG. 6 is a flowchart showing an operation of the wireless communication method executed by the CPU 21 of the wireless terminal device TA. FIG. 6 shows procedures in which the wireless terminal device makes a request for connection and performs communication using acquired idle-channel information in a standby mode. Note that in this example, a home repeater inserts two pieces of idle-channel information in the communication frame shown in FIG. 5 (when there are equal to or more than two idle channels) and transmits the communication frame. However, the number of pieces of the idle-channel information inserted in the communication frame is not limited to two, and it is fine that the number of pieces of the idle-channel information is equal to or more than three as far as a restriction of the frame format in FIG. 5 permits. The repeaters $111_1$ to $111_n$ are connected one another via the system bus 115, and as explained above, write information in slots allocated to respective own repeaters, and acquire information on another repeater written in a slot allocated to another repeater. The repeater selects, based on the acquired information on another repeater, multiple repeaters in an idle channel state by what corresponds to the number of pieces of idle-channel information to be inserted in the communication frame. For example, following techniques are adopted as a technique of selecting an idle channel.

(1) Start searching in a direction in which a channel number ascends (from a channel number 1 in a case of the largest channel number) from the channel number of a own repeater and select channel information on a repeater that is in an idle channel state in this order.

(2) Start searching in a direction in which the channel number descends (from the largest channel number in a case of the smallest channel number) from the channel number of the own repeater and select channel information on a repeater that is in an idle channel state in this order.

(3) Each repeater selects at random.

As explained above, when a home channel (the channel of a home repeater) is busy, idle-channel information is inserted in the communication frame in FIG. 5, and the wireless terminal devices TA to TH can acquire that idle-channel information. Conversely, when the home channel is not in use, the home repeater transmits no radio wave, but transmits an idle message indicating that the local repeater is an idle channel at a certain time interval (e.g., 10 seconds). Idle-channel information on another repeater is also inserted in the idle message, and the wireless terminal device TA can acquire the idle-channel information.

The wireless terminal devices TA to TH each starts a process shown in FIG. 6 after the power is turned on.

The CPU 21 of the wireless terminal device determines whether or not the communication frame of a downlink signal is received from a home repeater (e.g., the repeater $111_1$ in a case of the wireless terminal device TA) (step S101), and when receiving the downlink signal, acquires idle-channel information in that communication frame and stores the acquired idle-channel information in the RAM 23 (step S102). At this time, when the idle-channel information included in the communication frame are plural idle-channel information, all pieces of idle-channel information are acquired and stored in the RAM 23.

Next, it is determined whether or not a calling operation is made through the operating unit 27 (step S103), and when the calling operation is made, the idle-channel information stored in the RAM 23 is read (step S104). In this example, as the two pieces of idle-channel information are stored, either one of idle channels is selected. Between the two pieces of idle-channel information, a permission for communication is requested to the selected idle channel (step S105). The CPU 21 waits for a permission signal to the request for communication permission (step S106). When the response signal is received, a communication is started via the permitted channel (step S107). For example, any one of followings is adopted as a technique of selecting either one of the idle channels.

(1) Set each wireless terminal device to select at random.

(2) Change a rule for selection based on the number of channels of a home repeater which registers a wireless terminal device. For example, when the number of channels of the home repeater is an odd number, an idle channel which is an even number is selected, and when the number of channels of the home repeater is an even number, an idle channel which is an odd number is selected, or, when the number of channels of the home repeater is the odd number, the idle channel which is the odd number is selected, and when the number of channels of the home repeater is the even number, the idle channel which is the even number is selected. Alternatively, when the number of channels of the home repeater is an odd number, an idle channel with a smaller channel number is selected, when the number of channels of the home repeater is an even number, an idle channel with a larger number is selected, or conversely, when the number of channels of the home repeater is the even number, the used channel with the larger channel number is selected, and when the number of channels of the home repeater is the even number, the idle channel with the smaller number is selected.

(3) Change a rule for selection based on identification information unique to a wireless terminal device. For example, when the identification information is an odd number, an idle channel which is an even number is selected, and when the identification information is an even number, an idle channel which is an odd number is selected, or, when the identification information is the odd number, the idle channel which is the odd number is selected, and when the identification information is the even number, the idle channel which is the even number is selected. Alternatively, when the identification information is an odd number, an idle channel with a smaller channel number is selected, and when the identification information is an even number, an idle channel with a larger channel number is selected, or conversely, when the identification information is the odd number, the idle channel with the larger channel number is selected, and when the identification information is the even number, the idle channel with the smaller channel number is selected.

Conversely, in the step S106, when the permission signal for a own station (e.g., TA) is not received, but a permission signal for other wireless terminal devices (e.g., TB to TD) is received, information on an idle channel currently permitted for transmission to the other wireless terminal devices (e.g., TB to TD) is acquired (step S108). In this example, as two pieces of idle-channel information are included in the communication frame, like the case of the step S104, one of the acquired two pieces of idle-channel information is selected and a permission for communication is requested (step S109). The CPU 21 waits for a permission signal to the request for communication permission (step S110). When the permission signal is received, a communication is started via the permitted channel (step S107).

In the step S110, when the permission signal for the own station (e.g., TA) is not received but a permission signal for the other wireless terminal devices (e.g., TB to TD) is received, the process returns to the step S108, and information on an idle channel currently permitted for transmission to the other wireless terminal devices (e.g., TB to TD) is acquired. The processes from the step S108 to the step S110 are repeated until a permission signal for a communication is received.

It is determined whether or not the communication in the step S107 has ended (step S111), and when the communication has ended, in a case in which a downlink signal is not received from the home repeater in the step S101 or in a case in which a calling operation is not made in the step S103, the CPU 21 waits for a downlink signal from the home repeater in the step S101.

As explained above, in the foregoing embodiment, when wireless terminal devices wirelessly communicate with each other via the relaying operation of the individual repeaters $111_1$ to $111_n$, the wireless terminal device acquires identification information of an idle channel from a communication frame received from the repeater, writes the acquired identification information of the idle channel in the RAM 23, and selects a piece of identification information of a channel among plural pieces of identification information of a channel written in the RAM 23 to start making a call to a channel of the selected identification information.

In this case, when the channel which was selected and to which the call was made has transitioned from an idle state to an busy state, the wireless terminal device newly acquires identification information of an idle channel from a communication frame received from the repeater which has transitioned from the idle state to the busy state, and as explained above, selects a piece of identification information of a channel among plural pieces of identification information of a channel to start making a call to a channel of the newly selected identification information.

Moreover, the wireless terminal device preferentially selects identification information of a channel which is written most recently among plural pieces of identification information of a channel written in the RAM 23 to start making a call.

Consequently, according to the foregoing embodiment, when plural wireless terminal devices wirelessly communicate with each other via the channel of a repeater, it is possible to avoid any occurrence of concentration of transmissions in the same channel and avoid a probability of occurrence of collision of calls from becoming high. As a result, in a wireless communication system with the limited number of channels, idle channels are used efficiently, thereby suppressing any congestion of communication beforehand.

Note that the foregoing embodiment is provided to give explanations of the present invention, the present invention is not limited to the foregoing embodiment, and other embodiments and modified examples which can be though out by those skilled in the art are also included in the present invention without departing from the scope and the spirit of the present invention.

For example, as a modified example of the embodiment, a configuration may be employed in which a piece of idle-channel information is inserted in an idle message to be transmitted at a regular interval when a repeater is idle, and two idle channels are inserted when the repeater is occupied by the communication of other wireless terminal devices. That is, the number of pieces of idle-channel information to be inserted is changed in accordance with the operational status of the repeater. This enables operation of a wireless communication system in accordance with the operational status of the repeater, and moreover, when it is presumed that a collision probability is low, the load of a channel selection process by the wireless terminal device becomes reduced.

Moreover, as another modified example, when equal to or more than three pieces of idle-channel information are inserted in the communication frame of a downlink from individual repeaters $111_1$ to $111_n$, the selecting technique of such pieces of idle-channel information may be changed as needed.

Such configuration enables further reduction of the probability of collision between wireless terminal devices when an idle channel is used.

Description of Reference Numerals $111_1$ to $111_n$ Repeater
TA to TH Wireless terminal device
104 Server
115 System bus (communication line)
130 Repeater system

The invention claimed is:

1. A wireless communication system comprising:
a relay system including a plurality of relay devices which are connected one another via a communication line and to which unique relaying channels are respectively allocated; and
a plurality of wireless communication terminal devices which communicate with each other via the relay system, wherein
each relay device transmits control information to the wireless communication terminal device which is registered in the each relay device,
each wireless communication terminal device selects, based on the control information received from the relay device which registers the each wireless communication terminal device, a channel which is currently able to relay communication among channels allocated to the respective relay devices to establish communication between the wireless communication terminal devices,
each relay device transmits a predetermined number of pieces of information on an idle relay channel selected in accordance with a predetermined rule among a plurality of pieces of information on an idle relay channel acquired via the communication line to the wireless communication terminal device which is registered in the each relay device, and
each wireless communication terminal device starts establishing communication between the wireless communication terminal devices on an idle relay channel selected in accordance with the predetermined rule based on the predetermined number of pieces of information on an idle relay channel received and acquired from the relay device which registers the each wireless communication terminal device.

2. The wireless communication system according to claim 1, wherein each relay device selects the predetermined number of pieces of information on an idle relay channel in an ascending order of number from a channel number of the each relay device or in a descending order of number from the channel number of the each relay device among the plurality of pieces of information on an idle relay channel acquired via the communication line, and transmits the selected pieces of information on an idle relay channel to the wireless communication terminal device which is registered in the each relay device.

3. The wireless communication system according to claim 1, wherein each wireless communication terminal device starts establishing communication between the wireless communication terminal devices on an idle relay channel selected at random based on the acquired predetermined number of pieces of information on an idle relay channel.

4. The wireless communication system according to claim 1, wherein each wireless communication terminal device starts establishing communication between the wireless communication terminal devices on an idle relay channel selected in accordance with a different rule according to the relay device which registers the each wireless communication terminal device based on the acquired predetermined number of pieces of information on an idle relay channel.

5. A wireless communication method allowing a plurality of wireless communication terminal devices to communicate with each other via a relay system including a plurality of relay devices which are connected one another via a communication line and to which unique relaying channels are respectively allocated, wherein
each relay device transmits control information to the wireless communication terminal device which is registered in the each relay device,
each wireless communication terminal device selects, based on the control information received from the relay device which registers the each wireless communication terminal device, a channel which is currently able to relay communication among channels allocated to the respective relay devices to establish communication between the wireless communication terminal devices,
each relay device transmits a predetermined number of pieces of information on an idle relay channel selected in accordance with a predetermined rule among a plurality of pieces of information on an idle relay channel acquired via the communication line to the wireless communication terminal device which is registered in the each relay device, and
each wireless communication terminal device starts establishing communication between the wireless communication terminal devices on an idle relay channel selected in accordance with the predetermined rule based on the predetermined number of pieces of information on an idle relay channel received and acquired from the relay device which registers the each wireless communication terminal device.

6. A wireless communication terminal device for a wireless communication system comprising a relay system including a plurality of relay devices which are connected one another via a communication line and to which unique relaying channels are respectively allocated, and a plurality of wireless communication terminal devices which communicate with each other via the relay system, each relay device transmitting control information to the wireless communication terminal device which is registered in the each relay device, and each wireless communication terminal device selecting, based on the control information received from the relay device which registers the each wireless communication terminal device, a channel which is currently able to relay communication among channels allocated to the respective relaying devices to establish communication between the wireless communication terminal devices, wherein the wireless communication terminal device receives a predetermined number of pieces of information on an idle relay channel selected in accordance with a predetermined rule based on a plurality of pieces of information on an idle relay channel acquired via the communication line by the relay device which registers the each wireless communication terminal device, and starts establishing communication between the wireless communication terminal devices on an idle relay channel selected in accordance with the predetermined rule based on the predetermined number of pieces of information on an idle relay channel.

7. The wireless communication terminal device according to claim 6, which starts establishing communication between the wireless communication terminal devices on an idle relay channel selected at random based on the acquired predetermined number of pieces of information on an idle relay channel.

8. The wireless communication terminal device according to claim 6, which starts establishing communication between the wireless communication terminal devices on an idle relay channel selected in accordance with a different rule according to the relay device which registers the each wireless communication terminal device based on the acquired predetermined number of pieces of information on an idle relay channel.

9. A relay device for a wireless communication system comprising a relay system including a plurality of relay devices which are connected one another via a communication line and to which unique relaying channels are respectively allocated, and a plurality of wireless communication terminal devices which communicate with each other via the relay system, each relay device transmitting control information to the wireless communication terminal device which is registered in the each relay device, and each wireless communication terminal device selecting, based on the control information received from the relay device which registers the each wireless communication terminal device, a channel which is currently able to relay communication among channels allocated to the respective relay devices to establish communication between the wireless communication terminal devices, wherein the relay device transmits a predetermined number of pieces of information on an idle relay channel selected in accordance with a predetermined rule among a plurality of pieces of information on an idle relay channel acquired via the communication line to the wireless communication terminal device which is registered in the each relay device.

10. The relay device according to claim 9, which selects the predetermined number of pieces of information on an idle relay channel in an ascending order of number from a channel number of the each relay device or in a descending order of number from the channel number of the each relay device among the plurality of pieces of information on an idle relay channel acquired via the communication line and which transmits the selected pieces of information on an idle relay channel to the wireless communication terminal device which is registered in the each relay device.

11. A relay system comprising a plurality of relay devices which are connected one another via a communication line and to which unique relaying channels are respectively allocated, each relay device transmitting control information to a wireless communication terminal device which is registered in the each relay device, and each wireless communication terminal device selecting, based on the control information received from the relay device which registers the each wireless communication terminal device, a channel which is currently able to relay communication among channels allocated to the respective relay devices to establish communication between the wireless communication terminal devices, wherein each relay device transmits a predetermined number of pieces of information on an idle relay channel selected in accordance with a predetermined rule among a plurality of pieces of information on an idle relay channel acquired via the communication line to the wireless communication terminal device which is registered in the each relay device, and each wireless communication terminal device starts establishing communication between the wireless communication terminal devices on an idle relay channel selected in accordance with the predetermined rule based on the predetermined number of pieces of information on an idle relay channel received and acquired from the relay device which registers the each wireless communication terminal device.

12. The relay system according to claim 11, wherein each relay device selects the predetermined number of pieces of information on an idle relay channel in an ascending order of number from a channel number of the each relay device or in a descending order of number from the channel number of the each relay device among the plurality of pieces of information on an idle relay channel acquired via the communication line, and transmits the selected pieces of information on an idle relay channel to the wireless communication terminal device which is registered in the each relay device.

13. The relay system according to claim 11, wherein each wireless communication terminal device starts establishing communication between the wireless communication terminal devices on an idle relay channel selected at random based on the acquired predetermined number of pieces of information on an idle relay channel.

14. The relay system according to claim 11, wherein each wireless communication terminal device starts establishing communication between the wireless communication terminal devices on an idle relay channel selected in accordance with a different rule according to the relay device which registers the each wireless communication terminal device based on the acquired predetermined number of pieces of information on an idle relay channel.

* * * * *